April 15, 1958  E. E. VETTESE  2,830,462
APPARATUS FOR ROTATING WORK PIECES MOVING THROUGH A FURNACE
Filed July 21, 1954  2 Sheets-Sheet 1

INVENTOR.
ERNEST E. VETTESE
BY
E. Willford Mason
ATTORNEY

April 15, 1958     E. E. VETTESE     2,830,462
APPARATUS FOR ROTATING WORK PIECES MOVING THROUGH A FURNACE
Filed July 21, 1954                              2 Sheets-Sheet 2

INVENTOR.
ERNEST E. VETTESE
BY
E. Walford Mason
ATTORNEY

United States Patent Office 2,830,462
Patented Apr. 15, 1958

2,830,462

APPARATUS FOR ROTATING WORK PIECES MOVING THROUGH A FURNACE

Ernest E. Vettese, Camden, N. J., assignor to Selas Corporation of America, Philadelphia, Pa., a corporation of Pennsylvania Application July 21, 1954, Serial No. 444,738

6 Claims. (Cl. 74—422)

The present invention relates to toothed gearing, and particularly toothed gearing for use in rotating vertical work carrying spindles moving in regular succession through an elongated furnace or kiln. One commercial embodiment of apparatus in use prior to the present invention, is disclosed and claimed in the Maud et al. Patent 2,376,161, granted May 15, 1945. The apparatus illustrated in said patent, comprises a plurality of work supporting spindles carried by alternate links of a link belt conveyor. The conveyor is supported and rotated by two pulleys one at each end of the conveyor. Each pulley is arranged to rotate about a horizontal axis so that the work supports are continuously being moved through the furnace when extending upright above the upper level of the pulleys and are returned from the outlet end to the inlet end of the kiln at a level below said pulleys.

In said prior patent, the work pieces heated in the furnace are carried by vertical rotatable spindles which are rotated as they pass through the furnace, by means of gear wheels, each coaxial with and connected to and rotating a corresponding work supporting spindle. Each of said gear wheels has teeth which mesh with the teeth of a stationary rack gear alongside the path of movement of the gear wheels as the latter enter and move through the kiln. With the gear wheels carried by the spindles in operative engagement with the rack bar during a portion only of each conveyor cycle of movement, it is necessary to provide effective means for bringing each toothed wheel into proper angular position to mesh with the teeth of the rack bar at the beginning of the spindle rotating engagement of each spindle with the rack bar. In the operation of the apparatus illustrated in the above mentioned patent, each gear wheel attached to and surrounding a rotatable work supporting spindle is engaged by a positioning tooth carried by a lever operative to move that tooth into the space between an adjacent pair of gear wheel teeth as that gear wheel approaches the position in which its teeth mesh with the rack bar teeth.

A primary object of the present invention is to provide improved means for so angularly adjusting each gear wheel, as it moves into engagement with the rack bar, so as to insure the proper meshing of the gear wheel teeth with the stationary rack bar teeth.

With the apparatus disclosed herein and the apparatus disclosed in said prior patent, the proper meshing of the rack bar and gear wheel teeth is occasionally prevented by the failure of a gear wheel carried by one of the rotating spindles to rotate in its intended manner. Without such rotation it is obviously impossible to effect the normal intermeshing action of the gear wheels and rack bar.

A further and practically important object of the invention is to provide simple and effective means for interrupting the movement of the conveyor relative to the kiln whenever a gear wheel about to engage the rack bar, refuses to rotate in its normal manner. Such interruption of the conveyor travel avoids injurious contact of the non-rotating wheel with the rack bar.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
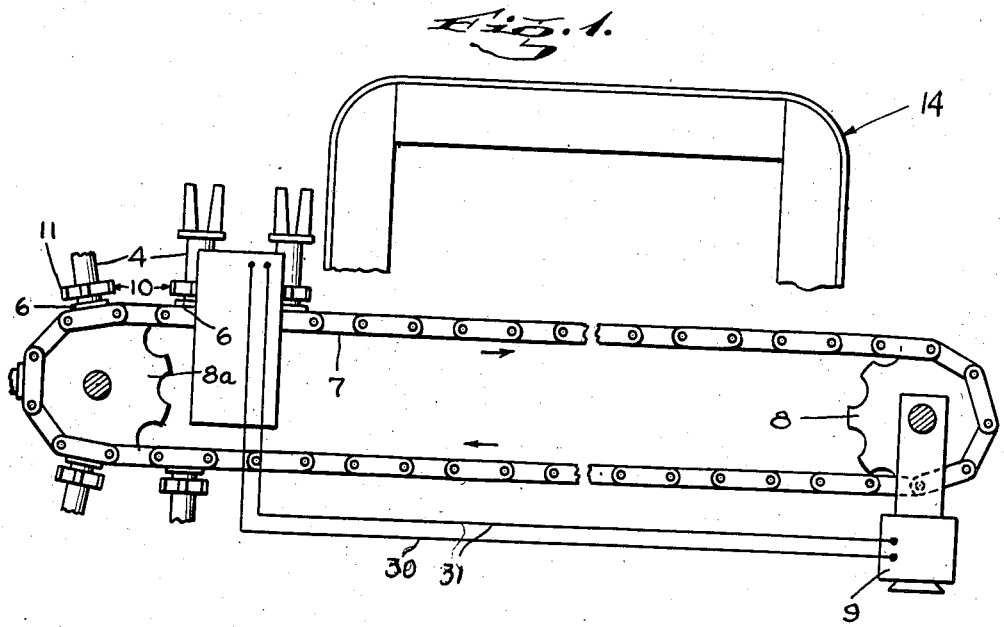
Fig. 1 is a diagrammatic representation of a furnace and continuous belt conveyor for moving work supports into a furnace at one end and out of the furnace at the other end.
Figure 2:
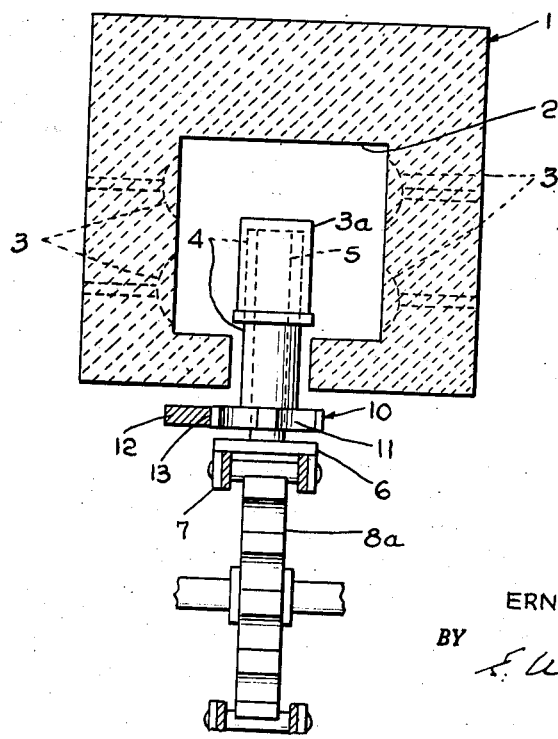
Fig. 2 is an end elevation of the furnace and conveyor shown in Fig. 1.

The embodiment of the invention illustrated in the accompanying drawings, includes a horizontally elongated furnace 1 with a furnace chamber in the form of a longitudinal slot 2 open at the underside and ends of the furnace. The furnace may be heated by fluid fuel burning in cavities 3 in the side walls of the slot. The work pieces 3a heated in the furnace are moved through the latter on rotatable tubular work supports 4 which surround and are journalled on non-rotating shafts or posts 5. Each of the latter extends transversely away from and is rigidly connected at one end to a corresponding link 6 of a link belt conveyor 7. The latter is looped about a pulley 8 adjacent but spaced away from the outlet end of the furnace, and about a pulley 8a adjacent and spaced away from the inlet end of the furnace. Each of said pulleys is mounted to turn about a horizontal axis, and a motor 9, gear connected to the driving pulley 8, normally moves the conveyor 7 through the furnace. The portion of the conveyor 7 at the upper side of the pulleys 8 and 8a runs along and is supported by furnace framework below the furnace. A separate gear wheel 10 surrounds and is attached to a lower portion of each tubular work support 4. In normal operation as each support 4 moves through the kiln chamber 3, the teeth 11 of the gear wheel 10 attached to said support, are in mesh with the gear teeth 13 of a stationary rack bar 12. The latter is supported by the furnace supporting framework 14. Insofar as above described, the apparatus shown in the drawings comprises nothing claimed as novel herein, but on the contrary, is like the apparatus disclosed in said prior Patent 2,376,161.

As will be plainly apparent to those skilled in the art, the invention may be used with apparatus, and particularly with link belt conveyor and furnace apparatus quite different in form and mounting from that shown in said prior patent. However, the structural similarities between the apparatus illustrated herein and that disclosed in said prior patent, simplify the illustration and description of features of the apparatus shown but not claimed as novel herein.

Figure 3:
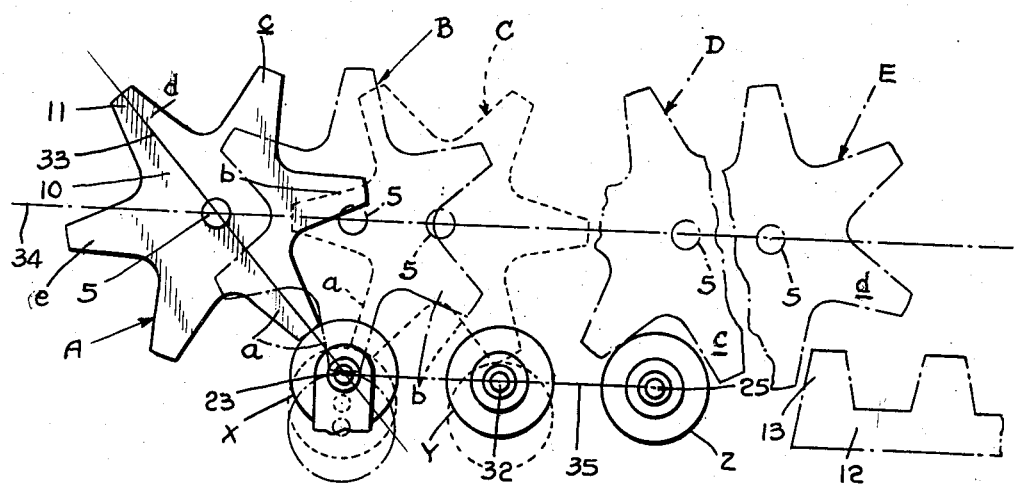
Fig. 3 is a diagrammatic plan view of a portion of the apparatus illustrating the adjustment of a star wheel into a proper position for rack bar engagement.

The gear wheels 10 attached to the tubular work supports 4 shown diagrammatically in Fig. 3, advantageously differ in form from the corresponding gear wheels shown in said prior patent in respect to the spacing and form of the gear wheel teeth. In practice, each gear wheel 10 may well have about the same diameter as each of the corresponding gears of the prior patent, though each gear wheel 10 has only a half dozen teeth, whereas each corresponding gear shown in the prior patent has more than two dozen teeth. Assuming the same radial distance between the gear axis and the ends of the gear teeth, the gear teeth 11 disclosed herein are substantially longer than the corresponding gear teeth of the prior patent. In consequence, the gear wheels 10 are commonly and appropriately referred to as "star wheels." The relatively wide space between each pair of adjacent teeth of the star wheel 10 results in a correspondingly wide spacing of the rack bar teeth 13. In practice, moreover, each rack bar tooth may well be in the simple form of a flat plate transverse to the length of the rack bar and having sides which are parallel to one another and to the axes of the wheels 10.

The reduction in the number of the meshing teeth required, is not a mere unimportant departure in form from the disclosure of the prior art, but results in a reduction in the cost of the toothed wheels and in the cost of the associated rack bar, and in a simplification of the required adjustments of the star wheels preparatory to their engagement with the rack bar. The risk of a binding engagement of a gear wheel 10 with its support 4, or other failure of the star wheel to rotate in the normal manner, is greater rather than less in the use of the prior art than in the use of the present invention. Moreover, the present invention is unique in that it includes simple and effective means for automatically interrupting the movement of the conveyor on a failure of any one of the star wheels to rotate, before resultant injury of the star wheel or rack bar can occur.

With each star wheel 10 free to turn about its supporting post 5, each star wheel will be automatically brought into meshing engagement with the associated rack bar teeth 13, as a result of the normal engagement of the side of at least one tooth 11 of the star wheel with one or more of the three discs x, y and z of the star wheel adjusting unit 14 shown in each of Figs. 1 and 3–6. The unit 14 is interposed between the inlet end of the furnace 1 and the pulley 8a. The unit 14 comprises a stationary frame structure 15 including a horizontal plate-like element 16 terminating in an uprising stop portion 17 alongside the conveyor path of movement and parallel to the axes of the work supports 4. The unit 14 also includes rigid plate-like elements 18, parallel to and laterally displaced from, and in fixed position relative to the stop portion 17. The unit 14 also includes a floating beam 19 biased for horizontal movement into engagement with the stop 17 by springs 20 and 21. The bias spring 20 acts between the plate 18 and a yoke 22 which is connected by a pivot 23 to the end of the beam 19 farthest away from the furnace. The previously mentioned disc x is pivotally mounted in the yoke 22. A plate-like part 24 is welded or otherwise secured to the end of the beam 19 nearest to the furnace. The previously mentioned disc z is connected to the last mentioned end of the beam 19 by a pivot 25 having one end anchored to said beam. The spring 21 is compressed by movement of the beam carried part 24 toward the plate element 18.

Figures 4, 5:
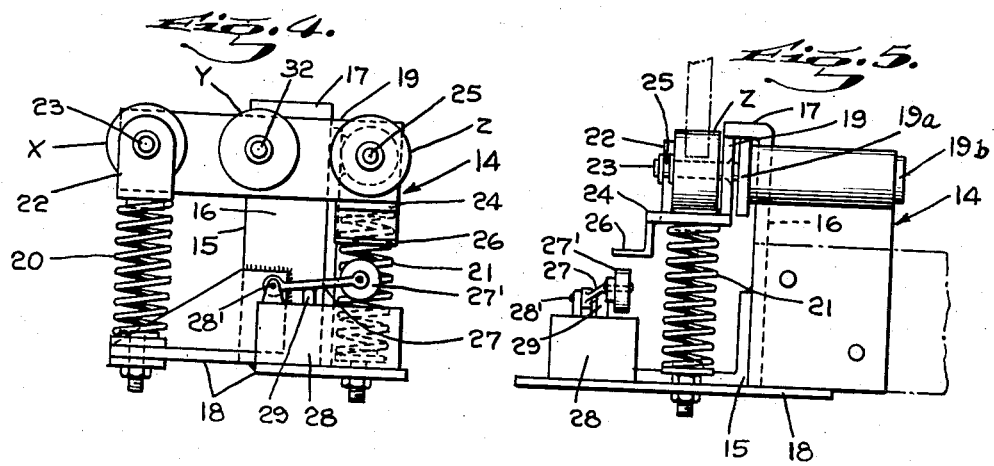
Fig. 4 is a plan view of a portion of the adjusting apparatus shown in part in Fig. 3.
Fig. 5 is a plan view taken at right angles to Fig. 4.
Figure 6:
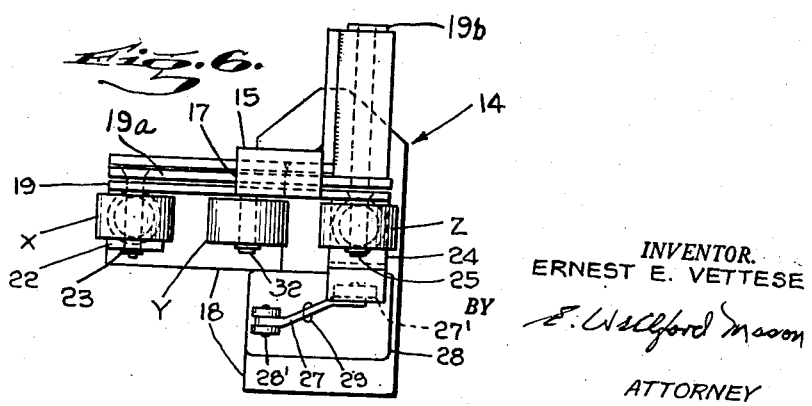
Fig. 6 is an elevation of apparatus shown in Figs. 4 and 5.

As shown in Fig. 6, the pivot 23 connects the floating beam 19 to the framework 15 through a swinging arm 19a having one end connected to the pivot 23 and having its other end connected to a pivot 19b journalled in the stationary framework 15, and in alignment with the pivot 25 when the latter is in its position shown in Fig. 4.

When the end of the beam 19 carrying the part 24 is given a sufficiently great movement toward the plate 18, it interrupts the operation of the motor 9 and thereby interrupts the movement of the conveyor 6. Such interruption of the motor 9 is effected through the movement given to the free end 27' of a switch arm 27 by an extension 26 of the member 24. The second end of the arm 27 is connected by a pivot 28' of a switch member 28 secured to the plate 18. The switch member 28 includes an element 29 having one end extending through the wall of the switch 28 with its outer end in position for engagement by the switch arm 27. When the extent of movement given the lever end 27' by the extension 26 is sufficient, the resultant movement given the element 29 operates through circuit conductors 30 and 31, which connect the switch 28 to the motor 9, to interrupt the operation of the motor and stop the movement of the belt conveyor. The energization of the switch 28 thus prevents injurious engagement of the rack bar tooth 13 by a non-rotating star wheel.

The disc y is journalled on a pivot 32 having one end pivotally secured to the beam 19 intermediate the pivots 23 and 25. In normal operation, the unit 14 adjusts each star wheel as may be necessary to properly mesh with the rack bar end tooth 13, except when the star wheel engages the disc x through a tooth a shown in Fig. 3 as bisected by the line 33. That line which I designate the "critical line" 33, extends through the axis of the pivot 23 and through the axis of the shaft 5. The star wheel 10 having its axis intersected by the line 33 and shown in full lines in Fig. 3, occupies a position designated A. In Fig. 3, B, C, D and E designate dotted line positions of the same star wheel as the latter moves successively nearer to the furnace. Each of the star wheel positions A, B, C, D and E has its axis on the line 34. A line 35, which may be called the center line of the conveyor, is parallel to the line 34 and intersects the axes of the discs x, y and z when those discs occupy the positions in the unit 14 shown in Fig. 3. The critical line 33 extends through the axis of the pivot 23 and through the axis of the star wheel 10 shown in full lines in Fig. 3, and bisects a tooth a of that wheel. The tooth a then has its end bearing against the periphery of the disc x.

When a star wheel free to rotate about its supporting shaft engages the disc x as does the tooth a of Fig. 3, the star wheel turns bodily about the axis of the pivot 23 until the continuous movement of the star wheel along the conveyor center line 34 causes the tooth a to move out of engagement with the disc x. While in engagement with the disc x, the latter will have its axis progressively depressed below the line 35, as seen in Fig. 3, until the center line of the tooth a extends transversely to the lines 34 and 35. Further rotation in the same direction of the tooth a will permit the disc x to move back toward the line 35. After the clockwise rotation of the tooth b has brought the latter into engagement with the disc y and has pressed the axis of that disc some distance below the line 35 as seen in Fig. 3, the tooth a will slip out of engagement with the disc x. The star wheel 10 will then immediately turn counter-clockwise from its dotted line position C into a position in which the disc y is straddled by the teeth a and b.

Movement of the star wheel 10 from its dotted line position C into its dotted line position D will cause the disc z to be straddled by the teeth b and c. Further movement of the star wheel 10 to the right as seen in Fig. 3, will move the star wheel into its dotted line position E in which the end tooth 13 of the rack bar 12 is straddled by the star wheel teeth c and d.

As will be apparent from the foregoing explanations, the star wheel 10 shown in Fig. 1 subjects none of the discs x, y and z to significant displacement of their axes away from the line 35 after the tooth a has moved out of engagement with the disc x. However, it is possible, but not probable, that after the disc 10 has straddled the disc y, the immediately following star wheel 10 may have a tooth engage the periphery of the wheel x as it is engaged by the tooth a of the star wheel which has moved into the position A. The star wheel movements just described are normal, though somewhat infrequent, and do not result in the deenergization of the motor 9.

If the star wheel 10 ceases to rotate while in any of the star wheels positions A, B, C and D shown in Fig. 3, and fails to resume rotation soon enough, damaging contact of the star wheel with the rack bar may result unless the operation of the motor 9 is interrupted with suitable dispatch. Such damage is prevented by actuation of the switch 28. This occurs, if the star wheel is not rotating, when a tooth of the star wheel engages the surface of disc z to move it downwardly against the spring 21 around 23 as a pivot. Extension 26 then engages 27' to actuate the switch.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A combination comprising a rack bar having an elongated row of teeth, a plurality of star wheels each having a peripheral row of teeth, means for successively moving said star wheels along a path including a portion alongside said rack bar and an approach portion through which said star wheels are successively moved into a position in which the teeth of the star wheels mesh with said rack bar teeth, and adjusting mechanism alongside said approach portion comprising a plurality of discs biased for movement into respective positions in which the discs may be successively straddled by successive pairs of teeth of a star wheel moving into a position in which its teeth mesh with the rack bar teeth.

2. A combination as specified in claim 1, including means actuated by said adjusting mechanism to interrupt the movement of said star wheels along said path when a star wheel fails to rotate while moving through said approach portion.

3. A combination as specified in claim 1, in which said plurality of discs are mounted on said adjusting mechanism at successively decreasing distances from said rack bar, said adjusting mechanism including a framework alongside the approach portion of said path and in which said discs are mounted for movement toward and away from said path portion, and supporting biasing means normally operative to maintain said discs at predetermined minimum distances from said path portion, means operative to move each disc away from said path portion when a star wheel engaging said disc ceases to rotate, and means actuated to interrupt the movement of said star wheels along said path on a predetermined movement away from said path portion of one of said discs relatively close to said rack bar.

4. The combination of a plurality of toothed wheels rotatable about an axis and separately mounted on successive sections of a means that moves through a path and each wheel being normally rotatable about an axis transverse to the direction of movement, a rack bar alongside said path and in position for meshing engagement with the teeth of each wheel moving alongside the rack bar, and an adjusting unit adjacent the approach end of said rack bar and including a plurality of discs alongside the path of movement of the work supporting members and spaced at different distances from the adjacent end of said rack bar, the teeth of each wheel being normally operative to engage each disc to give rotative movement to the wheel as the wheel moves past said unit, said discs being so located with respect to said rack bar that the teeth of each wheel are successively adjusted into position to mesh with the teeth of the rack bar alongside the latter.

5. A combination as specified in claim 1, including means for interrupting the movement of said means for moving said star wheels on the failure of a star wheel to operatively rotate as it approaches the position in which the teeth of said star wheel would mesh with the rack bar teeth if said star wheel was in a rotatable condition.

6. An apparatus for lining up the teeth of a star wheel with a rack, the combination of a rack, a plurality of rotatable star wheels, means to move said star wheels in sequence along a path in which the star wheels mesh with the rack and are rotated thereby, and means to adjust the star wheels angularly so that the teeth thereof will mesh with the teeth of the rack comprising a plurality of members, means to mount said members adjacent to the approach end of said rack in position to be straddled by successive pairs of star wheel teeth to adjust said teeth in position to mesh with said rack, and means to hold said members resiliently in said position whereby a member can move away from said position if a star wheel tooth engages the same, said holding means urging said member back to said position to thereby rotate the star wheel to an angular position in which it will mesh with said rack.

References Cited in the file of this patent
UNITED STATES PATENTS 2,376,161    Maud et al. _____ May 15, 1945